Oct. 4, 1960     F. S. McCULLOUGH ET AL     2,954,969
WEIGHING CONVEYORS

Filed July 17, 1956     3 Sheets-Sheet 1

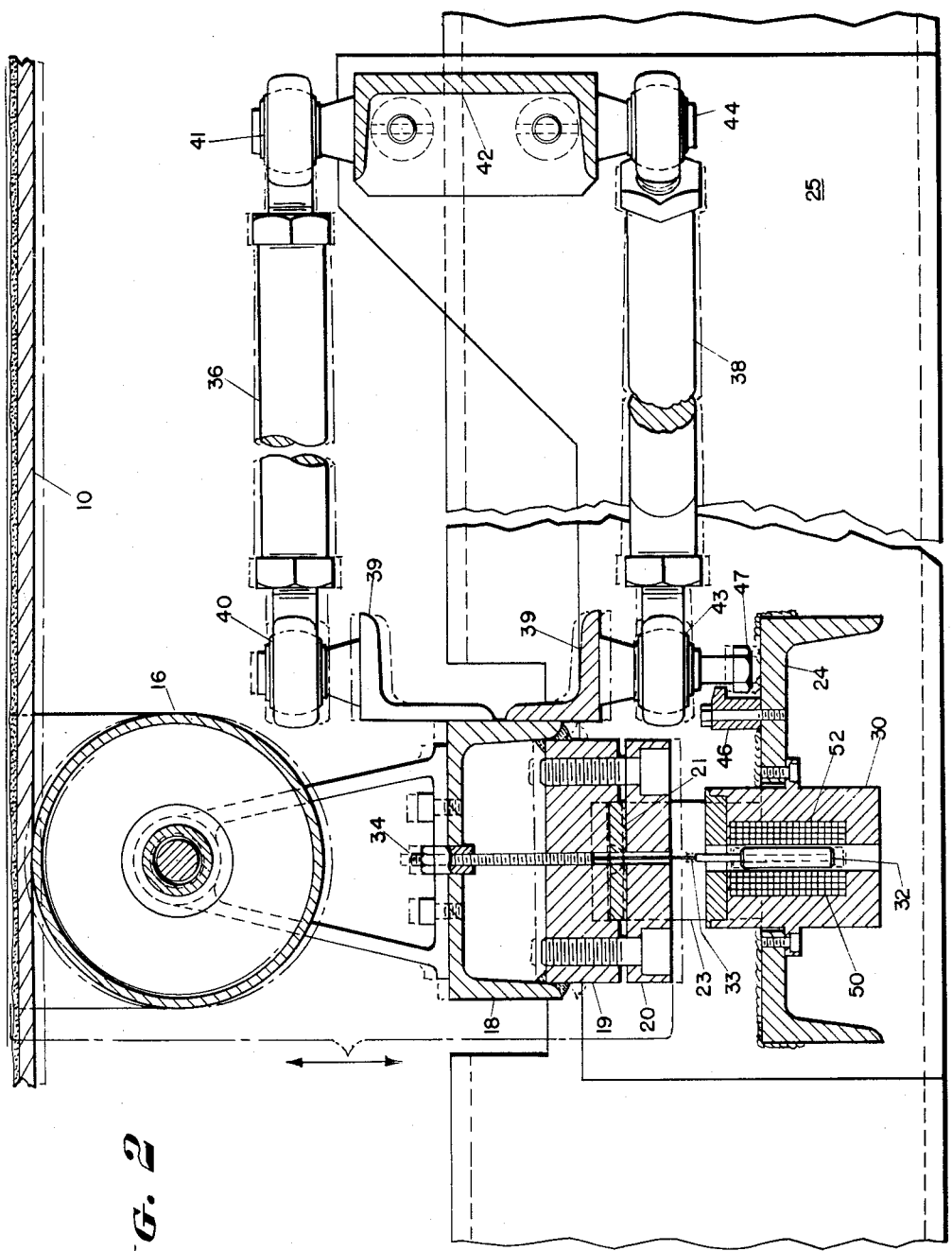

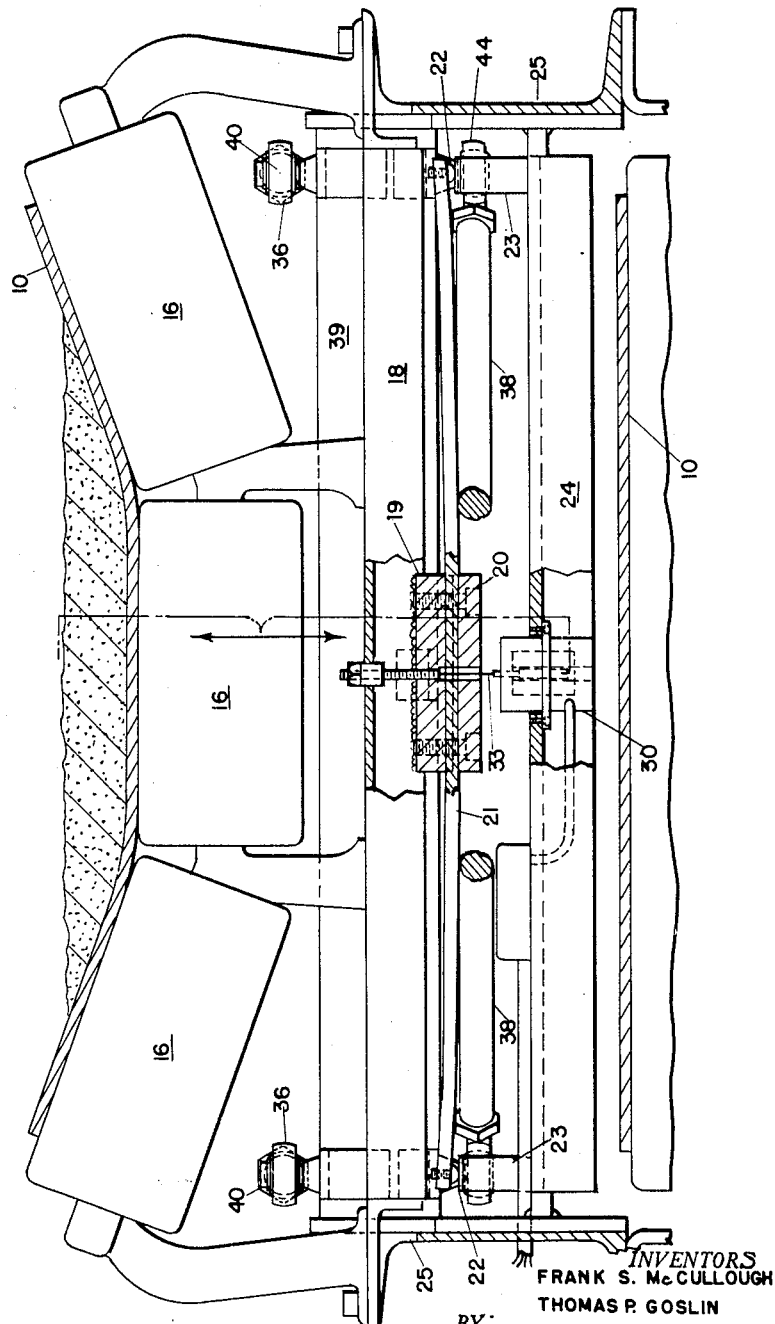

United States Patent Office 2,954,969
Patented Oct. 4, 1960

2,954,969
WEIGHING CONVEYORS

Frank S. McCullough, Kenmore, and Thomas P. Goslin and Robert W. Clausing, Tonawanda, N.Y., assignors, by mesne assignments, to Streeter-Amet Company, Grayslake, Ill., a corporation of Illinois Filed July 17, 1956, Ser. No. 598,304

1 Claim. (Cl. 265—27)

This invention relates to continuous weighing of material in transport on a belt conveyor or the like, and more particularly to an improved apparatus adapted to provide integrated measurements of load weights and conveyor speeds in such systems.

Certain prior art devices for similar purposes utilize weighing devices employing knife edges which wear easily and thereby lack proper sensitivity and mechanical joints and mechanical integrators which require careful and constant maintenance to insure accurate performance. Also, some of the prior designs employ largely mechanical or pneumatic components and thereby do not lend themselves readily to remote indication or recording arrangements, and they are generally so bulky as to make their use disadvantageous because of space limitations at the conveyor. Also, such mechanical and pneumatic type designs require relatively large installation and overhaul manhour investments.

The present invention has for a primary object elimination of the aforesaid disadvantages of the prior systems and to provide a new and novel apparatus for continuous weighing of conveyed materials and for integration of the weight and conveyor speed readings, in improved manner.

This invention contemplates, generally, a weighing apparatus such as may be conveniently installed on any belt conveyor, including devices observing the belt load weight and the speed at which the material is being conveyed; a device combining and integrating the weight and speed functions; a device visually indicating the integrated weight; and a device recording the combined weight and speed functions without integration. More specifically, the load weighing component of the invention includes means whereby the weight of material on a given length of the belt causes an extremely small deflection on a flat spring; which deflection is translated by means of a transducer into a varying voltage reading output. A novel parallelogram support structure for the spring actuating belt roller minimizes effects of horizontal forces on the system such as would otherwise be introduced by the moving belt. Hence, the spring deflection and consequent differential transformer voltage output is a function of the weight of the material at any instant on the weighing portion of the belt.

A voltage proportional to the belt speed is derived by attachment of a tachometer generator to the conveyor belt return idler pulley, or other convenient portion of the conveyor. The voltage proportional to belt speed is amplified and applied to the winding of the differential transformer measuring belt deflection. Hence, the output voltage of the differential transformer is the product of the belt speed and weight of material on the weighing section of the conveyor. This weight-rate product may then be indicated and/or recorded on a self-balancing type recorder using a differential transformer in the follow-up loop.

Integration and indication of the weight-rate product derived from the differential transformer and the tachometer is accomplished by introducing the product of these two signals into a velocity servomechanism. This velocity servomechanism produces a motor shaft rotation of velocities proportional to the input signal; in this case, the product of the differential transformer and the tachometer generator signals. Since the servomechanism output shaft velocity is proportional to the product of the belt deflection and the belt speed, the total angular displacement of the servomechanism output shaft is proportional to the integral of the belt deflection and the belt speed product, or, to the total weight of material transported by the belt conveyor during the time in which the shaft rotation is measured. A revolution counter attached to the servomechanism output shaft through a suitable gear reduction provides a convenient method for indicating the totalized weight.

Having thus generally described the invention, particular reference will now be made, by way of example, to a specific structural arrangement embodying the invention as illustrated in the accompanying drawing, wherein:

Figure 2 is a fragmentary enlarged scale side elevational view, with portions in section, of a detail of Fig. 1;

Figure 3 is a front elevational view of the mechanism of Fig. 2;

Figure 4:
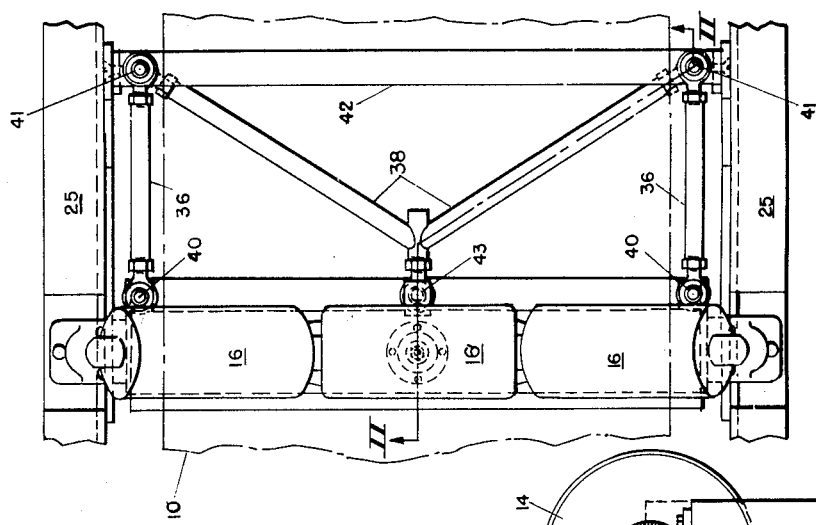
Figure 4 is a top plan view thereof.

Referring now to the drawing, a material weighing arrangement constructed according to the invention is illustrated by way of example to embody an endless belt 10 which runs on end rollers 12—14 and is driven at either end of the conveyor as by a motor 15. The load carrying strand of the belt 10 moves over a roller set 16 which is supported by a cross-bar 18. As shown in Figs. 2–3 bar 18 carries a center block 19 against which a cap plate 20 holds a leaf spring 21. The preferred material for this spring 21 is a material having a constant modulus of elasticity and low temperature coefficient of expansion such as Ni Span "C" alloy. The spring 21 is fitted at its outer ends with bearing 22—22 which rest upon abutments 23—23 extending upwardly from a cross-bar 24 to the conveyor frame sills 25—25. Thus, equal lengths of the spring 21 extend from either side of the clamp device 19—20, and the roller set 16 is thus spring-supported by the member 21.

A differential transformer as indicated at 30 is mounted on the bar 24 below spring 21 and its armature as indicated at 32 suspends from the conveyor bar 18 by means of a stem 33 and moves therewith as the spring 21 deflects under varying belt load conditions to produce an output voltage proportional to the input voltage on the transformer winding and to the relative displacement from a balanced position of the differential transformer armature and windings. The stem 33 is vertically adjustable upon the mounting bar 18, as by means of a screw-thread device indicate at 34 (Fig. 2).

A hinged parallelogram type brace device comprising struts 36 and 38 is provided to restrain the belt load responsive mechanism from being affected by forces horizontal to the belt such as the effects of conveyor belt tension or the like. Hence, the parallelogram brace arrangement prevents the spring 21 from being subjected to anything other than bending forces. The struts 36 each attach at one end to the roller bar 18 through an angle 39 and a universal bearing 40. Similar bearings 41 at the opposite end of the struts 36 attach the latter to a rigid cross frame member 42. The diagonally disposed struts 38—38 attach at their front ends by means of a bearing 43 to the cross bar 18 through an angle 39, and at their rear ends by spaced bearings 44—44 to the cross bar 42.

The bearings 40, 41, 43, 44 are all of ball-and-socket type, and are therefore universally movable; the angle and bar unit 39—18 being thereby held by the struts 36—38 against any displacements longitudinally of the conveyor system, while at the same time being free to float upwardly and downwardly (as indicated by broken lines in Fig. 2) upon the fixed mounts of the rear bearings 41—44. The hinged parallelogram strut arrangement as viewed for example in Fig. 2 operates to stabilize the cross bar 18 and the roller set 16 mounted thereon in a constant upright attitude while at the same time permitting full freedom of up and down motion of the roller set 16 in response to variations in the load moving thereover. The bottom struts 38—38, being arranged diagonally in relation to the cross bars 39—42, function to stabilize the roller carrying assembly against displacements in directions laterally of the direction of conveyor motion. A stop device as indicated at 46 (Fig. 2) may be preferably mounted on the cross bar 24 to cooperate with a screw-threaded adjustable nut device 47 suspending from the vertically movable roller support frame as shown in Fig. 2, whereby to limit the upwardly and downwardly motions of the spring balanced roller set within the necessary working limits thereof. Thus, it will be appreciated that it is a particular feature of the present invention that the entire subassembly including the roller sets 16; the support cross bars 18, 39, 42, 24; the guide struts 36, 38; and the transducer and leaf spring components 30, 21, may be readily furnished for quick assembly into any conventional type prefabricated conveyor system with maximum facility.

To install the device of the invention it is only necessary to weld or otherwise mount the opposite ends of the cross bars 24, 42 between the sills of the conventional conveyor installation, and to make the electrical connections hereinafter described, whereupon the unit is ready to operate.

A tachometer generator 45 is coupled through gear train 46 to any suitable portion of the belt conveyor such as the roller 14. The tachometer generator is excited by the power line voltage and produces a voltage output whose amplitude is proportional to its driven speed, and hence the tachometer generator 45 produces an output voltage whose frequency is the line frequency and whose amplitude is proportional to the conveyor belt speed.

Figure 5:
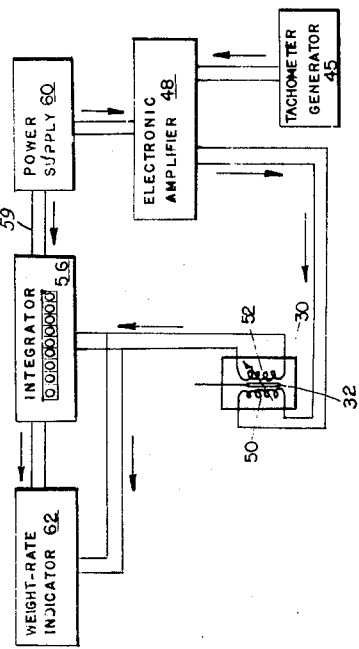
Figure 5 is a diagram of the arrangement of the electronic amplifiers, velocity servomechanism, integrator gear train, and revolution counter components of the mechanism.
Figure 1:
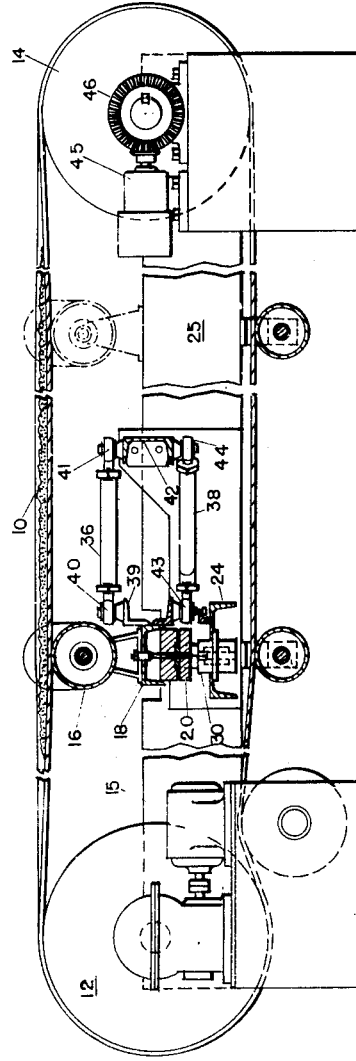
Figure 1 is a semischematic side elevational view of a conveyor arrangement embodying a weighing system of the invention.

The tachometer generator's output voltage may be amplified electronically as by an amplifier 48 to obtain sufficient power to properly excite the primary winding 50 of the differential transformer 30. The secondary winding 52 produces an output voltage proportional to the input on the primary winding as modified by positional changes of the transformer armature 32. Hence, the output voltage of the secondary winding 52 is a function of both the speed of the belt and of the load being carried thereby. This output voltage of the secondary winding leads to an integrator 56 (Fig. 5) which operates a counter mechanism indicating the total weight carried. As indicated at 62 (Fig. 5), an auxiliary weight rate indicator is also preferably embodied in the system; whereby the indicator 62 will provide to the observer momentarily a reading of the weight being carried per any desired unit of time.

It is a feature of the arrangement of the invention that the system utilizes the "self balancing principle" whereby the device is extremely accurate in performance. Line voltage fluctuations, such as are normally experienced in industrial power transmission systems, are nullified by virtue of this self balancing feature. The amplifier 48 utilizes negative feedback for maximum stabilization of its performance. Also, the tachometer generator 45 and differential transformer 30 are of such nature as to produce outputs of highly linear characteristics, and are, therefore, also extremely stable in performance. Hence, the mechanism of the invention is at the same time relatively simple mechanically and electronically, yet functions in an improved manner compared to arrangements of the prior art.

What is claimed is:

A continuously weighing conveyor subassembly unit adapted to be mounted upon a fixed base beneath the load carrying strand of an endless conveyor belt, comprising in combination, a first cross bar and a second cross bar adapted to be fixed to said base at positions spaced longitudinally of the conveyor, said first cross bar mounting thereon a transformer at a position centrally of the conveyor, a leaf spring supported at its opposite ends upon opposite end portions of said first cross bar in vertically spaced relation therefrom and carrying centrally thereof a mounting block, a third cross bar carried by said mounting block in vertically spaced relation from said leaf spring and extending parallel thereto and supporting at its opposite ends a conveyor roller unit disposed to vertically support the load carrying strand of the conveyor belt, an armature device fixed to said third mentioned cross bar and extending vertically therefrom into said transformer and vertically shiftable therein to vary the electrical output thereof, and a vertically hingeable parallelogram strut mechanism extending generally horizontally from said second mentioned cross bar into pivotal connections with said third mentioned cross bar whereby to support the roller unit to prevent displacement thereof in directions longitudinally and laterally of the direction of travel of said conveyor while permitting free motion of said roller unit in vertical directions responsive to variations of the load carried by said conveyor.

References Cited in the file of this patent

UNITED STATES PATENTS

| | | |
|---|---|---|
| 998,974 | Messiter | July 25, 1911 |
| 1,074,123 | Kinne | Sept. 30, 1913 |
| 1,174,337 | Messiter | Mar. 7, 1916 |
| 1,298,302 | Davis | Mar. 25, 1919 |
| 1,729,414 | Biehler | Sept. 24, 1929 |
| 2,100,653 | Umansky | Nov. 30, 1937 |
| 2,126,377 | Fear et al. | Aug. 9, 1938 |
| 2,213,982 | Frey | Sept. 10, 1940 |
| 2,712,547 | Thurston | Aug. 30, 1955 |